(12) United States Patent
Tanigaki et al.

(10) Patent No.: US 6,966,399 B2
(45) Date of Patent: Nov. 22, 2005

(54) SMALL VEHICLE WITH POWER STEERING ASSEMBLY

(75) Inventors: Satoshi Tanigaki, Cypress, CA (US); Toshiaki Nomura, Kani (JP)

(73) Assignees: Yamaha Motor Corporation, U.S.A., Cypress, CA (US); Kayaba Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/305,818

(22) Filed: Nov. 26, 2002

(65) Prior Publication Data

US 2004/0099470 A1   May 27, 2004

(51) Int. Cl.[7] .............................................. B62K 11/02
(52) U.S. Cl. ....................... 180/444; 180/443; 180/908
(58) Field of Search ................................ 180/908, 233, 180/245, 433–436, 443, 444, 446; 296/204

(56) References Cited

U.S. PATENT DOCUMENTS

| | | | |
|---|---|---|---|
| 3,131,602 A | | 5/1964 | Ford |
| 3,584,592 A | * | 6/1971 | Perrine ..................... 440/12.52 |
| 3,990,534 A | | 11/1976 | Weisgerber |
| 4,155,309 A | * | 5/1979 | Ames et al. ................ 105/456 |
| 4,173,987 A | | 11/1979 | Kouda |
| 4,410,059 A | | 10/1983 | Nakayama et al. |
| 4,488,615 A | * | 12/1984 | Millard ....................... 180/428 |
| 4,660,671 A | | 4/1987 | Behr et al. |
| 4,681,181 A | | 7/1987 | Shimizu |
| 4,712,633 A | | 12/1987 | Suzuki et al. |
| 4,796,714 A | | 1/1989 | Momiyama |
| 4,800,974 A | | 1/1989 | Wand et al. |
| 4,940,103 A | | 7/1990 | Momiyama |
| 4,951,199 A | * | 8/1990 | Whitehead .................... 701/41 |
| 5,125,490 A | | 6/1992 | Suzumura et al. |
| 5,253,730 A | * | 10/1993 | Hayashi et al. ............. 180/426 |
| 5,257,672 A | | 11/1993 | Ohtagaki et al. |
| 5,322,308 A | * | 6/1994 | Bishop ....................... 180/414 |
| 5,394,760 A | | 3/1995 | Persson et al. |
| 5,419,235 A | | 5/1995 | Gilbert et al. |
| 5,439,070 A | | 8/1995 | Haga et al. |
| 5,725,023 A | | 3/1998 | Padula |
| 5,742,351 A | | 4/1998 | Guede |
| 5,906,250 A | | 5/1999 | Haga et al. |
| 5,921,343 A | * | 7/1999 | Yamakaji .................... 180/436 |

(Continued)

FOREIGN PATENT DOCUMENTS

JP            64-074190         3/1989

OTHER PUBLICATIONS

The Motor Vehicle; Twelfth Edition; © 1996; Chapter 34, pp. 872-895.

*Primary Examiner*—Avraham Lerner
(74) *Attorney, Agent, or Firm*—Knobbe, Martens, Olson & Bear, LLP

(57) ABSTRACT

An all terrain vehicle has a pair of front wheels that support a frame assembly. An engine is supported by the frame assembly and a steering column is supported by the frame assembly at a location generally forward of the engine. A set of handlebars are connected to an upper portion of the steering column and a lower portion of the steering column is operatively connected to the pair of front wheels. A power steering assembly is disposed along a portion of the steering column. The power steering assembly is operatively connected to the steering column. The power steering assembly comprises a motor having a longitudinal axis that extends in a generally lateral direction and at least a portion of the motor overlies a portion of the frame assembly.

39 Claims, 6 Drawing Sheets

U.S. PATENT DOCUMENTS

| | | |
|---|---|---|
| 5,931,256 A | 8/1999 | Langkamp |
| 5,934,404 A * | 8/1999 | DeLellis et al. ............ 180/436 |
| 6,041,883 A | 3/2000 | Yokota et al. |
| 6,065,561 A | 5/2000 | Howard |
| 6,182,784 B1 | 2/2001 | Pestotnik |
| 6,196,072 B1 | 3/2001 | Toyohira et al. |
| 6,202,781 B1 * | 3/2001 | Ima ............................ 180/252 |
| 6,244,373 B1 | 6/2001 | Kojo et al. |
| 6,298,941 B1 | 10/2001 | Spadafora |
| 6,345,544 B1 | 2/2002 | Mizuno et al. |
| 6,390,228 B2 | 5/2002 | Serizawa et al. |
| 6,491,126 B1 | 12/2002 | Robison et al. |
| 6,536,293 B2 | 3/2003 | Shiba |
| 6,622,806 B1 * | 9/2003 | Matsuura ................... 180/68.1 |
| 2002/0038737 A1 | 4/2002 | Morishita et al. |
| 2003/0051937 A1 | 3/2003 | Takamoto et al. |
| 2003/0089166 A1 * | 5/2003 | Mizuno et al. ............ 73/118.1 |
| 2003/0132075 A1 * | 7/2003 | Drivers ....................... 188/350 |

* cited by examiner

SMALL VEHICLE WITH POWER STEERING ASSEMBLY

BACKGROUND OF THE INVENTION

1. Field of the Invention

The present invention generally relates to a power steering assembly adapted for use in a small all terrain vehicle. More specifically, the present invention relates to such a power steering assembly configured, oriented and positioned for use with a small all terrain vehicle.

2. Description of the Related Art

Small all terrain vehicles generally comprise a frame assembly that is carried by three or more wheels. Recent constructions of these vehicles feature a pair of front wheels that are steerable relative to the frame and a pair of rear wheels. An engine generally is mounted between the front wheels and the rear wheels because the frame assembly is narrowly constructed. The engine powers the rear wheels and, in some arrangements, the front wheels through suitable transmissions.

The engine generally comprises one or more combustion chambers that are partially defined by a cylinder block, a cylinder head and a reciprocating piston. The cylinder block may incline forward or to one side of the vehicle such that the overall height of the engine can be decreased.

An exhaust system generally communicates with the combustion chamber and provides a passage for exhaust gases generated within the combustion chamber to escape to the atmosphere. In many cases, the exhaust system communicates with a forwardly facing surface of the cylinder head and curves around at least a portion of the engine before providing an outlet that is positioned toward the rear of the vehicle.

The front wheels generally are supported by a suitable suspension system. In most arrangements, the front wheels are connected to the frame assembly by a double A-arm construction. The double A-arm construction provides an upper A-shaped member that has its point connected to an upper portion of the wheel assembly and a similar lower A-shaped member that has its point connected to a lower portion of the wheel assembly.

A shock absorber extends downward and outward from an upper portion of the frame assembly to a suitable portion of the double A-arm construction. The shock absorber provides some degree of control to the up and down movement of the associated wheel assembly during operation of the vehicle. Due to the narrow frame assembly and the angling of the shock absorbers, a relatively small envelope of space is defined between the left and right front suspension assemblies.

To effect steering movement of the front wheels, a handlebar assembly is positioned with its grips disposed in an appropriate location forward of the operator. The handlebar assembly is connected to a steering column for one-to-one movement. The steering column generally extends downward through the relatively small envelope of space defined between the left and right front suspension assemblies. At a lower end, the steering column carries a pitman arm that connects with one end of each of a pair of tie-rods. The tie-rods extend outward to a suitable portion of the front wheel assemblies and transfer the rotary motion of the steering column to generally linear movement of the tie-rods.

SUMMARY OF THE INVENTION

During operation, the vehicle can be physically tiring to steer. For instance, as size and complexity of these vehicles has increased, steering the vehicle without forward or rearward movement has become more difficult because of the weight supported by the steered wheels. In addition, the vehicle often traverses fairly large obstacles, which can affect the steering characteristics of the vehicle.

Accordingly, a power steering system is being developed for these small all terrain vehicles. Through the use of a power steering driving motor, the power steering system provides auxiliary torque to the steering shaft to supplement the torque supplied by the operator via the steering handle. The power steering system allows the operator to steer the all terrain vehicle with less effort.

While positioning the power steering driving motor on an all terrain vehicle parallel to and behind the steering shaft is possible, such a configuration suffers from several disadvantages. For example, this configuration renders the power steering driving motor particularly vulnerable to objects thrown up from the operating surface, such as stones or other debris. Additionally, this configuration subjects the power steering driving motor to a potentially damaging amount of exhaust heat from the engine because most engines are mounted just rearward of the steering shaft with an exhaust system that wraps rearward from a forward surface of the engine. Moreover, in this configuration the power steering driving motor is immediately adjacent to the shock absorbers, and thus can potentially interfere with the operation of the shock absorbers.

Thus, an arrangement is desired in which the power steering driving motor can be adequately protected from road debris and engine exhaust heat while avoiding interference with the shock absorbers.

Accordingly, one aspect of the present invention involves an all terrain vehicle comprising a frame assembly having a longitudinal portion and an upright portion. A pair of front wheels is provided with each of the front wheels being connected to the frame assembly by a mechanical linkage capable of pivotal movement relative to the frame assembly. A steering shaft is mounted to the frame assembly and is operatively connected to the front wheels such that rotational movement of the steering shaft imparts a steering movement to the front wheels. A power steering assembly comprises a longitudinal axis and is operatively connected to the steering shaft. The power steering assembly also is adapted to impart an auxiliary torque to the steering shaft. The longitudinal axis of the power steering assembly is oriented substantially perpendicular to the rotatable steering shaft and at least a portion of the longitudinal axis of the power steering assembly is positioned directly above a longitudinal portion of the frame assembly.

Another aspect of the present invention involves an all terrain vehicle comprising a frame assembly having a longitudinal portion and an upright portion. A plurality of wheels supports the frame assembly. At least one of the wheels is steerable by a rotatable steering shaft. A power steering assembly has a longitudinal axis and is operatively connected to the steering shaft. The power steering assembly is configured to impart an auxiliary torque to the steering shaft. The longitudinal axis of the power steering assembly is oriented substantially perpendicular to the rotatable steering shaft and at least a portion of the power steering assembly vertically overlaps a portion of the frame assembly.

A further aspect of the present invention involves an all terrain vehicle comprising a pair of front wheels. The pair of front wheels supports a frame assembly. An engine is supported by the frame assembly. A steering column is supported by the frame assembly. A set of handlebars is connected to an upper portion of the steering column. A lower portion of the steering column is operatively connected to the pair of front wheels. A power steering assembly is disposed along a portion of the steering column. The power steering assembly is operatively connected to the steering column. The power steering assembly comprises a motor having a longitudinal axis. The longitudinal axis of the motor extends in a generally lateral direction and at least a portion of the motor overlies a portion of the frame assembly.

BRIEF DESCRIPTION OF THE DRAWINGS

These and other features, aspects and advantages of the present invention will now be described with reference to the drawings of three preferred embodiments of the present invention, which are intended to illustrate, and are not intended to limit the scope of, the present invention. The drawings comprise six figures.

DETAILED DESCRIPTION OF THE PREFERRED EMBODIMENTS

Figure 1:
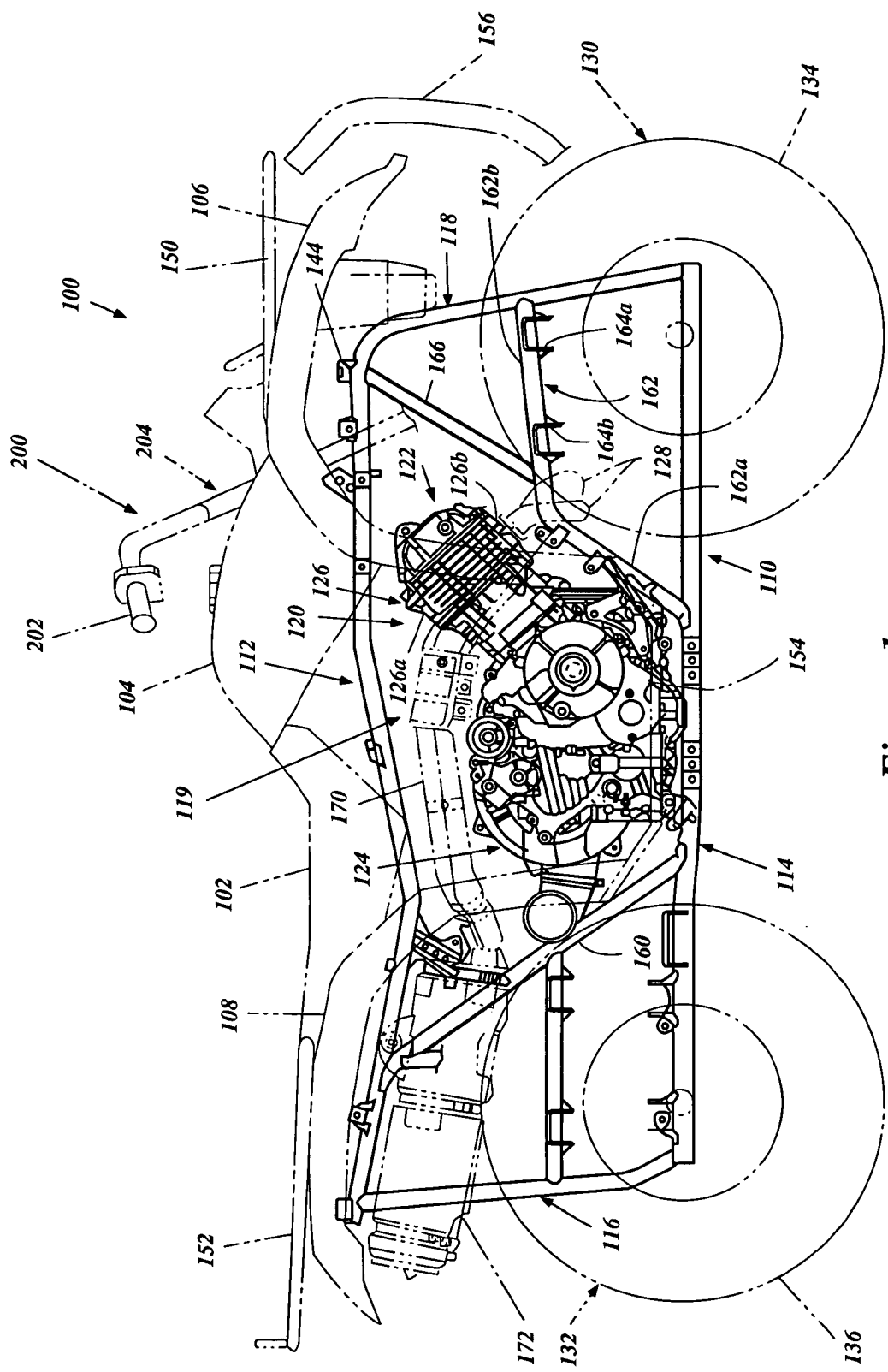
FIG. 1 is a side elevation view of a small vehicle arranged and configured in accordance with a preferred embodiment of the present invention. For clarity, certain components are illustrated with phantom lines while an engine and a frame assembly are illustrated with solid lines.

With reference initially to FIG. 1, a small all terrain vehicle 100 is illustrated. The vehicle 100 is arranged and configured in accordance with certain feature, aspects and advantages of the present invention. While the present invention will be described in the context of a small all terrain vehicle, other vehicles also may benefit form certain features, aspects and advantages of the present invention. For instance, vehicles having an exposed steering system (e.g., snowmobiles, lawn mowers, go-carts, etc.) may benefit from certain features, aspects and advantages of the present invention.

The vehicle 100 comprises a frame assembly 110. The frame assembly 110 can have any suitable construction. In one arrangement, the frame assembly 110 is configured to be a "double-cradle" type. In the illustrated arrangement, the frame assembly 110 comprises left and right side frame subassemblies each having a generally rectangular shape. Each of the illustrated subassemblies comprise an upper longitudinal member 112, a lower longitudinal member 114, a rear upright member 116 and a front upright member 118. These members can be suitably secured together, such as by welding, for instance.

The left and right side frame subassemblies each preferably further comprise several additional frame members to provide structural support for various components of the small all terrain vehicle 100. For example, a rear cross pipe 160 angles upward and rearward between the upper longitudinal member 112 and the lower longitudinal member 114. Similarly, a front cross pipe 162 extends upward and forward between the lower longitudinal member 114 and the front upright member 118. The front cross pipe 162 generally comprises an upright portion 162a and a longitudinal portion 162b. Additionally, a reinforcing pipe 166 extends generally upward and forward between the longitudinal portion 162b of the front cross pipe 162 and the upper longitudinal member 112.

The frame assembly 110 preferably further comprises a plurality of cross members (not shown) that connect the left side frame subassembly and the right side frame subassembly. Thus, the cross members generally extend laterally across the width of the frame assembly 110 of the vehicle 100.

An engine compartment 119 is defined within the frame assembly 110. The illustrated engine compartment 119 is generally open on the sides, the bottom, the front and the rear. The engine compartment 119 preferably comprises suitable mounting brackets and the like such that an engine unit 120 can be secured therein. The engine unit 120 preferably is centrally positioned within the frame assembly 110 in a lateral direction and preferably is centrally positioned within the frame assembly 110 in a longitudinal direction as well.

The engine unit 120 preferably comprises a water cooled, four cycle, inline two cylinder engine body 122 and a transmission case 124. In one arrangement, the transmission case 124 is integrally joined to a rear portion of the engine body 122. Other arrangements can also be used. The engine body 122 further comprises a cylinder head 126 which is preferably oriented such that an axis of the cylinders is forwardly inclined, thereby decreasing the overall height of the engine body 122.

Preferably, the cylinder head 126 comprises a rear wall 126a to which a carburetor is connected via an intake pipe (not shown). The cylinder head 126 preferably further comprises a front wall 126b to which exhaust pipes 128 for which each cylinder are connected. In the illustrated arrangement, the exhaust pipes 128 extend forward from the engine body 122 and then wrap rearward along the side of the cylinder head 126. The exhaust pipes 128 merge into a common converging pipe 170. The illustrated converging pipe 170 extends rearward from the side of the cylinder head 126 to an exhaust silencer 172, which is in fluid communication with the converging pipe 170. The exhaust silencer 172 preferably is positioned near the upper longitudinal member 112.

A seat 102 is positioned generally above the engine unit 120. Generally, the seat 102 is a saddle seat, which allows an operator to sit on the seat 102 with a leg disposed to each lateral side of the seat. In some arrangements, however, the seat 102 can be configured to allow an operator to have his or her legs and feet positioned forward of the seat 102. A pair of foot boards 154 can be supported by the frame assembly 110. Each of the foot boards 154 desirably supports one foot of a rider when the rider is positioned on or over the seat 102.

Forward of the seat 102, a fuel tank 104 is mounted to the frame assembly 110. A steering assembly 200 extends upward at a location forward of the fuel tank 104. The steering assembly 200 preferably comprises a handle bar 202 that is connected to a steering column 204 in any suitable manner. The steering column 204 is operatively connected to front wheels 130 through a suitable connection. Thus, the steering column 204 is turned by pivotal movement of the handlebars 202 and the rotational movement of the steering column imparts a steering movement to a set of front wheels 130. The steering assembly 200 will be described in greater detail below.

As illustrated, the frame assembly 110 preferably is supported by the front wheels 130 and a pair of rear wheels 132. In the illustrated arrangement, the front wheels 130 each comprise a low pressure, wide balloon tire 134 and the rear wheels 132 each comprise a similar low pressure, wide balloon tire 136.

Figure 2:
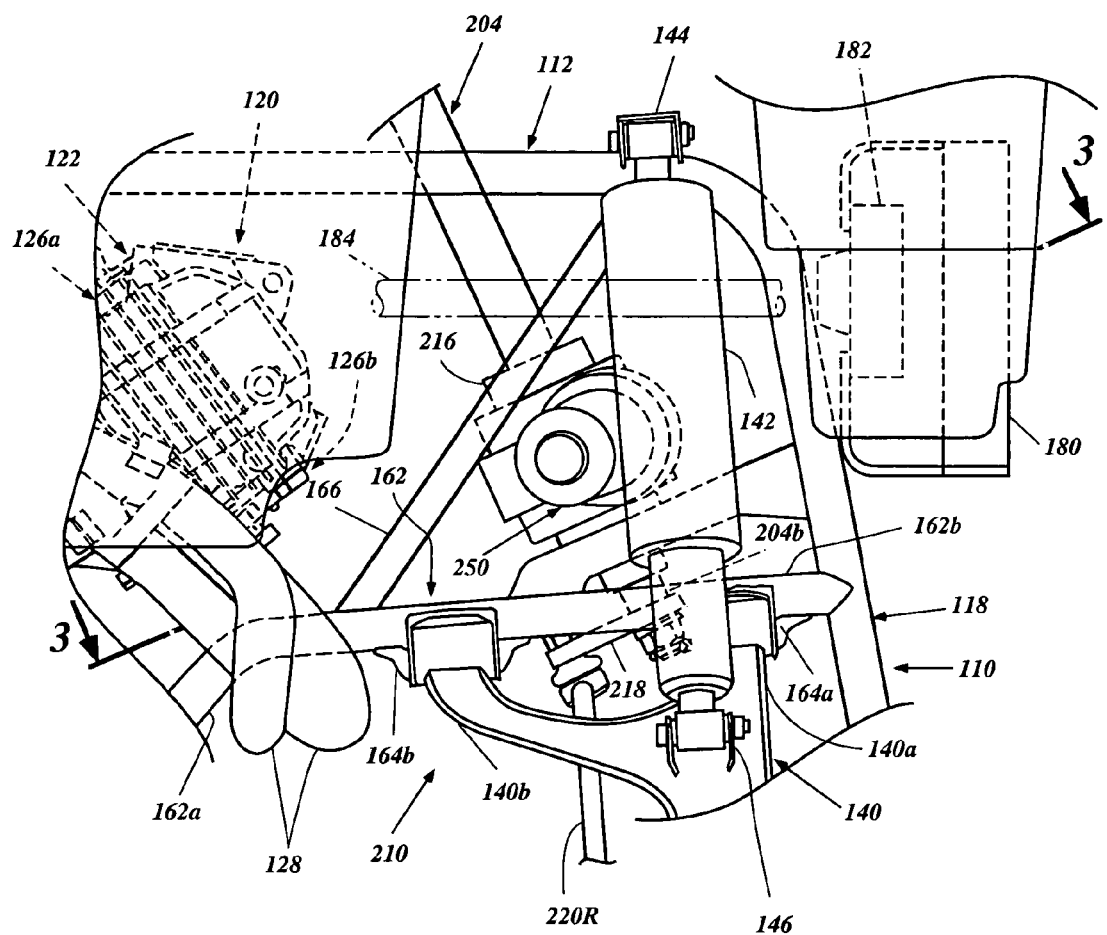
FIG. 2 is an enlarged partial side elevation view of a portion of the frame assembly of the vehicle of FIG. 1.

As illustrated in FIGS. 1 and 2, the front wheels 130 preferably are connected to the frame assembly 110 through suitable suspension components, such as an upper suspension arm member 140 and a shock absorber 142. The illustrated shock absorbers 142 extend between the upper longitudinal member 112 of the frame assembly 110 and the upper suspension arm member 140. Other suitable front suspension systems also can be used. Likewise, the rear wheels 132 also preferably are connected to the frame assembly 110 through a suitable suspension arrangement (not shown). The front wheel suspension system will be described in greater detail below.

With reference again to FIG. 1, the vehicle 100 also comprises a front fender assembly 106 and a rear fender assembly 108. The front and rear fender assemblies 106, 108 are provided to cover the upper parts of the front wheels 130 and the rear wheels 132. The front and rear fender assemblies 106, 108 can be connected to the frame assembly 110 in any suitable manner. Generally, the front and rear fender assemblies 106, 108 preferably are connected to the frame assembly 110 through the use of threaded fasteners or the like.

A front rack assembly 150 and a rear rack assembly 152 preferably are positioned over the front fender assembly 106 and the rear fender assembly 108, respectively. The front and rear rack assemblies 150, 152 enhance the load carrying capabilities of the vehicle 100. In the illustrated arrangement, the front and rear rack assemblies 150, 152 extend over at least a portion of the front wheels 130 and the rear wheels 132, respectively.

A bumper 156 preferably is disposed on a front end of the frame assembly 110. The bumper 156 can be formed integrally with the frame assembly 110 or can be connected to the frame assembly 110 in any suitable manner. The bumper 156 preferably wraps upward and rearward and can surround headlights or the like.

With reference now to FIG. 2, a radiator 180 and a cooling fan 182 are positioned in front of the front upright members 118. A supply hose 184 hydraulically connects the radiator 180 and the engine body 122, providing the engine body 122 with a source of cooling water. Likewise, a return hose (not shown) returns warmed cooling water from the engine body 122 to the radiator 180 for cooling and recirculating. The supply hose 184 can extend to the engine in any suitable lateral position but preferably is disposed at an elevation at or above the cylinder head 126.

Figure 3:
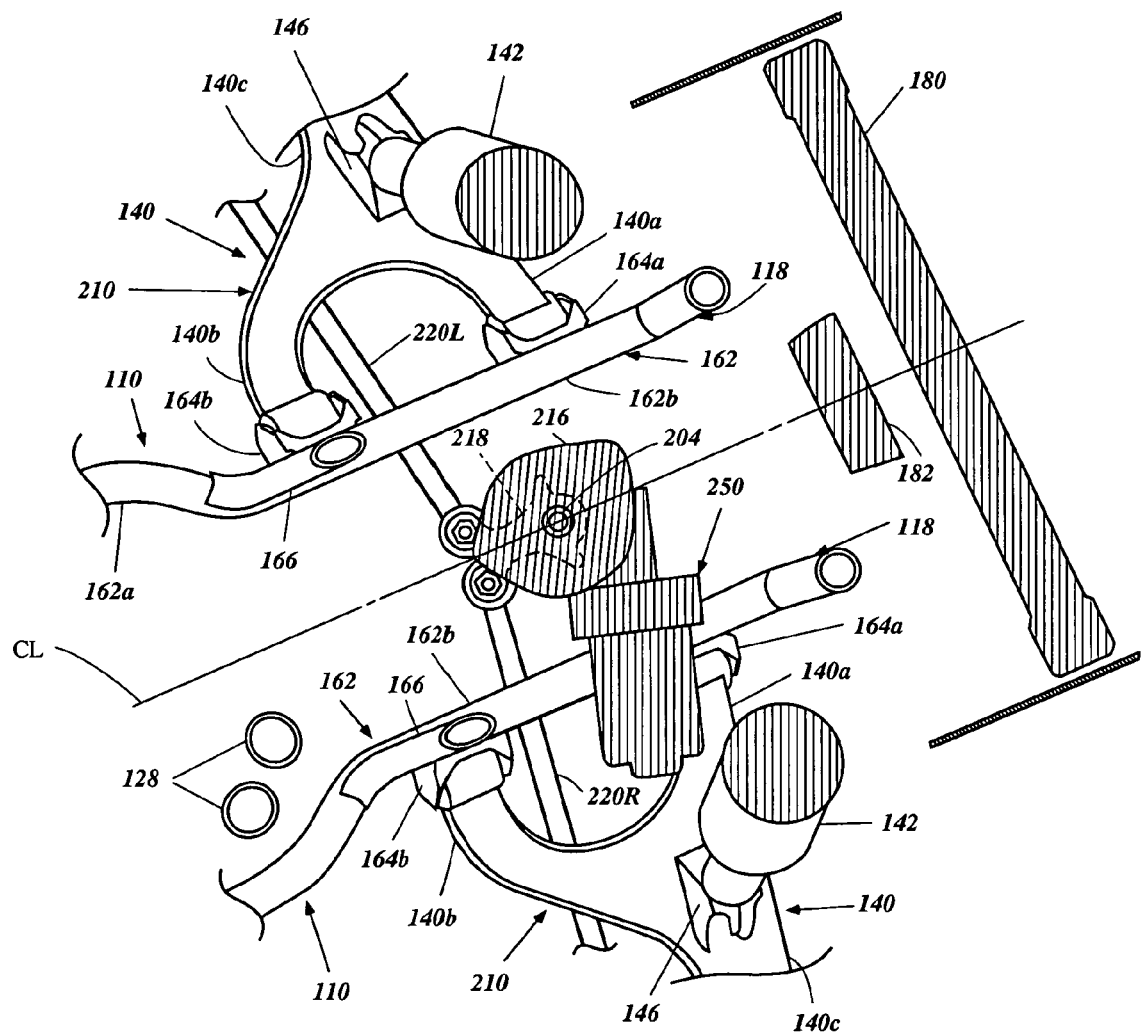
FIG. 3 is a sectional view taken along line 3—3 of FIG. 2 showing a power steering driving motor.

With reference to FIGS. 2 and 3, the front wheel suspension system 210 comprises the upper suspension arm member 140. The front wheel suspension system also preferably comprises a lower suspension arm member (not shown). The upper and lower suspension arm members support the front wheels 130 independently, thereby allowing each of the front wheels 130 to have independent vertical swinging movement. Additionally, shock absorbers 142 preferably are positioned between the upper suspension arm member 140 and the upper longitudinal members 112. The shock absorbers 142 are pivotally secured to the upper longitudinal members 112 by upper brackets 144, and are pivotally secured to the upper suspension arm member 140 by lower brackets 146.

The front wheel suspension system 210 preferably is of a double wishbone type. Particularly, upper suspension arm member 140 comprise front arm portions 140a and rear arm portions 140b. Front arm portions 140a are pivotally secured to the longitudinal portion 162b of the front cross pipe 162 by a first pair of suspension brackets 164a. Likewise, rear arm portions 140b are pivotally secured to the longitudinal portion 162b of the front cross pipe 162 by a second pair of suspension brackets 164b.

With reference to FIG. 3, the upper suspension arm member 140 and the lower suspension arm member (not shown) preferably comprise outer arm portions 140c. The outer arm portions 140c are pivotally connected to a wheel supporting member, such as a hub (not shown) that rotatably supports the front wheels 130.

Preferably, the lower suspension arm member (not shown) is pivotally secured to the frame assembly 110 in a similar manner as is the upper suspension arm member 140. In particular, the lower suspension arm member is preferably pivotally secured to the lower longitudinal member 114 via brackets.

Figure 4:
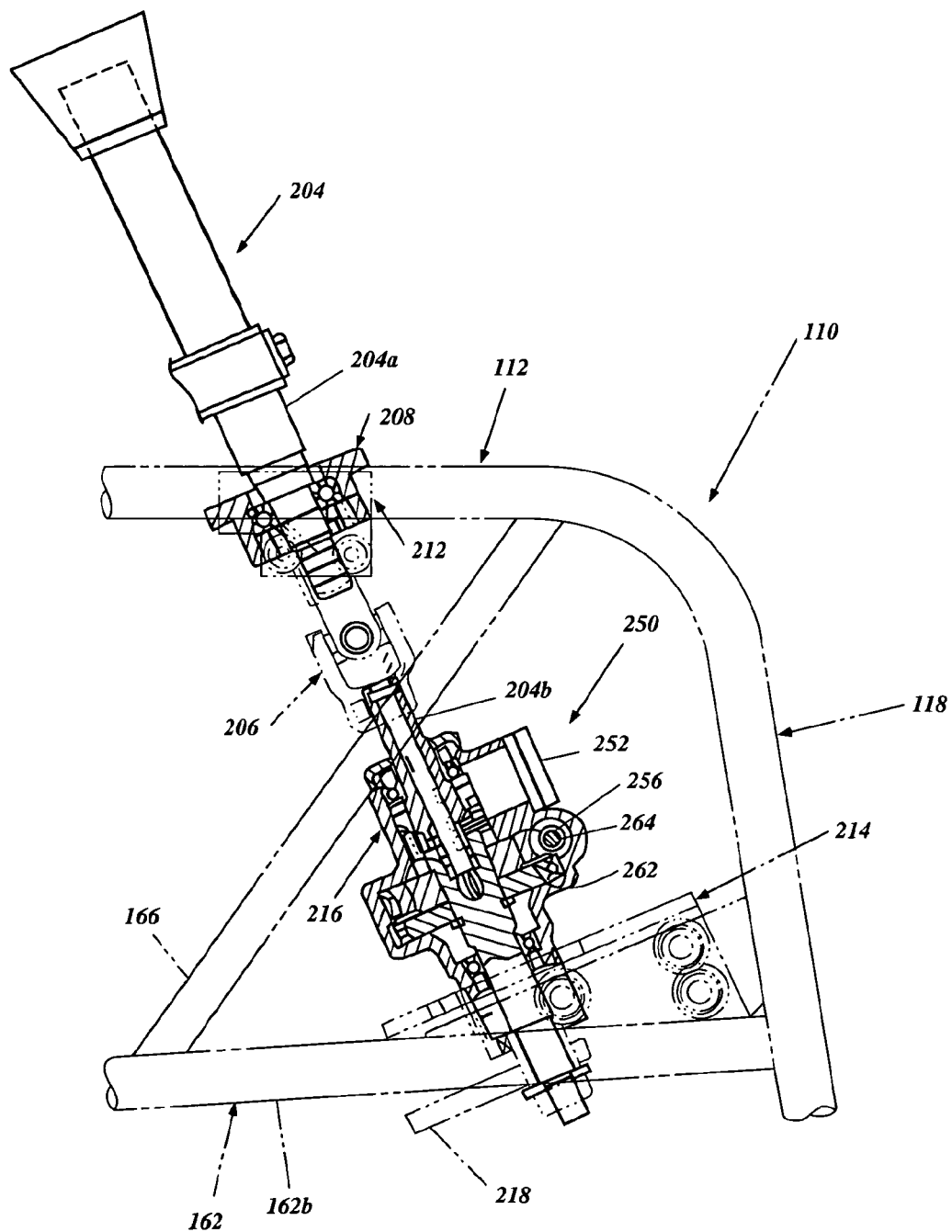
FIG. 4 is a partially sectioned side elevation view of a steering column of the vehicle of FIG. 1.

With reference now to FIGS. 2 through 4, the steering assembly 200 preferably comprises the steering handle bar 202, which is connected a steering column 204. The steering column 204 preferably is positioned in front of the engine unit 120 and is inclined downward along a generally vertical and longitudinally extending center plane CL of the vehicle 100.

With reference now to FIG. 4, the steering column 204 preferably comprises an upper shaft 204a and a lower shaft 204b, which are rotatably connected by a universal joint 206 or other suitable connection. The upper shaft 204a is rotatably supported by a shaft supporting member 208 via a bearing. The shaft supporting member 208 preferably is secured to an upper bracket 212, which extends between the left and right upper longitudinal members 112. Likewise, the lower shaft 204b preferably is rotatably supported by a lower bracket 214, which extends between the left and right longitudinal portions 162b of the front cross pipes 162. More particularly, in the illustrated arrangement, the lower shaft 204b is connected to the lower bracket 214 by virtue of a gear case 216 of a drive motor 250 being supported by the lower bracket 214 in a manner that is described in greater detail below.

The lower shaft 204b of the steering column 204 preferably is connected to a pitman arm 218. The pitman arm 218 is connected to a right tie rod 220R and a left tie rod 220L in any suitable manner. The right tie rod 220R and the left tie rod 220L are connected to the front wheels 130 via the wheel supporting member (not shown). This configuration causes rotational movement of the handle bar 202 and steering column 204 to be converted to lateral movement of the tie rods 220R, 220L by the pitman arm 218, which in turn imparts a steering movement on the front wheels 132.

Figure 5:
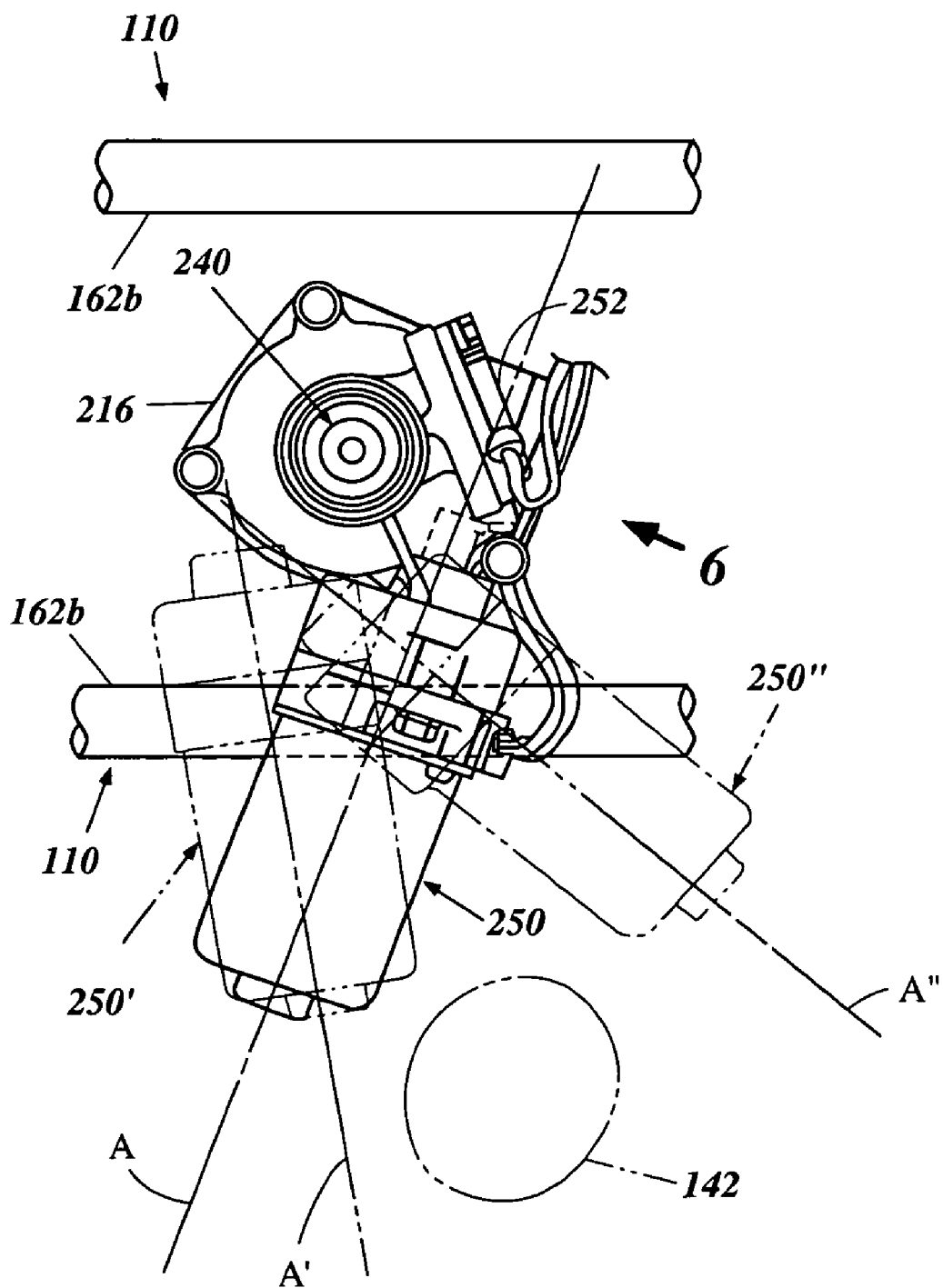
FIG. 5 is a top plan view of the power steering driving motor used by the vehicle of FIG. 1.
Figure 6:
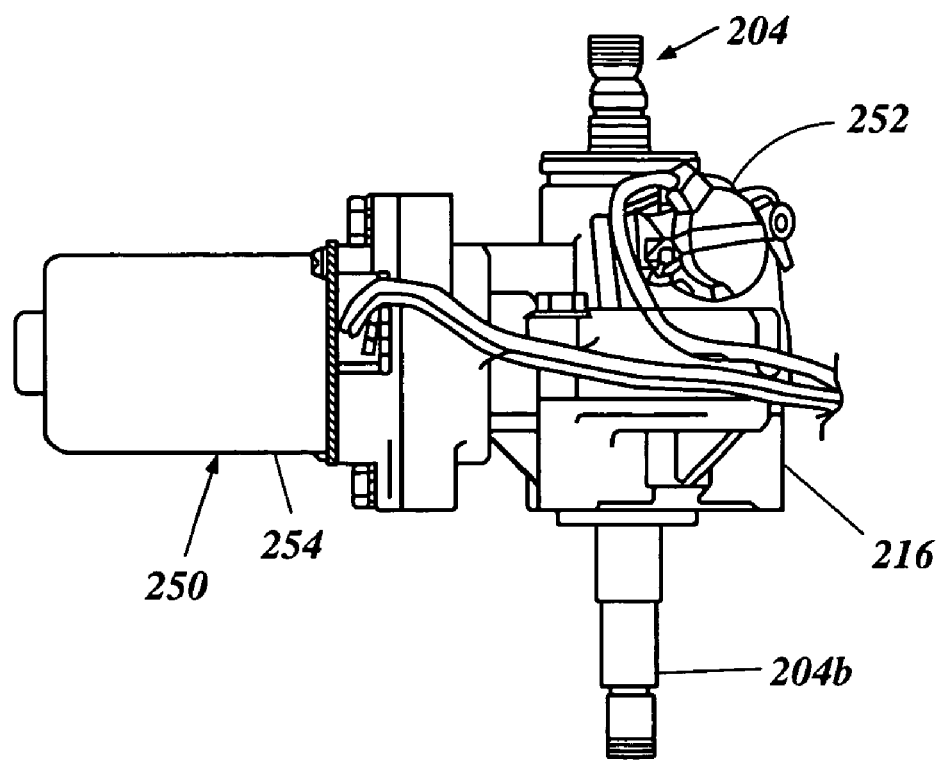
FIG. 6 is a front view of the power steering driving motor illustrated in FIG. 5, looking in the direction of Arrow 6.

With reference now to FIGS. 4 and 5, the power steering assembly is configured to provide auxiliary torque to the steering column 204 which then supplements the torque supplied by the operator via the handle bar 202. The power steering assembly preferably comprises the driving motor 250, a potentiometer 252, and a controller (not shown). The potentiometer 252, which is located on the front side of the gear case 216 in the illustrated arrangement, is configured to detect the rotational angle and velocity of the steering column 204. The controller preferably is configured to control the driving motor 250 based on the values detected by the potentiometer 252. The control of the driving motor 250 can be performed in any suitable manner.

The driving motor 250 preferably further comprises a motor body 254 and a drive shaft 256 that protrudes from the motor body 254. The drive shaft 256 is outfitted with a worm gear 264 which is configured to engage a worm wheel 262 that is secured on the lower shaft 204b of the steering column 204. The worm gear 264 is generally lower than the potentiometer 252. Under this configuration, operation of the driving motor 250 causes an auxiliary torque to be applied to the steering column 204.

With reference to FIGS. 4 and 5, the driving motor 250 preferably is arranged such that the drive shaft 256 is in front of and is substantially perpendicular to the steering column 204. In the illustrated arrangement, an axis A of the driving motor 250 extends over at least a portion of the frame assembly and extends rearward of the shock absorber 142 disposed on the same side of the vehicle 100. Thus, as illustrated in FIG. 3, the motor body 254 of the driving motor 250 is advantageously positioned at least partially behind one of the shock absorbers 142. Consequently, the motor body 254 extends outward in a transverse direction relative to the longitudinally extending center plane CL of the vehicle 100, such that the motor body 254 extends over at least a portion of the longitudinal portion 162b of the front cross pipe 162.

With reference now to FIG. 2, the driving motor 250 preferably is positioned in a triangular region defined among the front upright member 118, the longitudinal portion 162b of the front cross pipe 162, and the reinforcing pipe 166. Additionally, the supply hose 184 for supplying cooling water to the engine body 122 desirably passes in a region vertically higher than the driving motor 250. As illustrated in FIGS. 2 and 3, the driving motor 250 is offset from the cooling fan 182 both vertically and horizontally, thereby providing an unobstructed air path between the cooling fan 42 and the engine body 122. Such positioning also allows air to flow over the driving motor 250 for cooling and provides easy access to the driving motor 250 for maintenance and the like.

Positioning the driving motor 250 as described above protects the driving motor 250 from debris thrown up from the road surface. In particular, the longitudinal portion 162b of the front cross pipe 162, the upper suspension arm member 25, and the lower suspension arm member somewhat shield the driving motor 250 and obstruct unfettered contact between the driving motor 250 and debris that is thrown up from the road surface. Thus, damage to the drive motor 250 can be reduced or eliminated. Additionally, such positioning removes the driving motor 250 from the region directly adjacent to the exhaust system. Thus, the direct transference of heat from the exhaust system to the driving motor 250 is prevented and extraordinary heating of the driving motor 250 is reduced. The driving motor also may be somewhat cooled by the placement of the cooling water supply hose 184 adjacent to the driving motor 250.

With reference now to FIG. 5, two alternative positions for the driving motor 250 with respect to the shock absorber 142 are illustrated. As described above, driving motor 250 preferably is arranged such that the drive shaft 256 is in front of and is substantially perpendicular to the steering column 204. The motor body 254 of the driving motor 250 preferably is positioned at least partially behind one of the shock absorbers 142. Such a placement reduces the likelihood that the driving motor 250 will inhibit free movement of the front suspension components. Such a placement also positions the driving motor at a location vertically above the upper arm member 140, which somewhat shields the motor 250 from debris that may be encountered during operation of the vehicle 100.

In another arrangement, the driving motor 250' (shown in phantom line) is positioned such that the drive shaft 256 is behind of and substantially perpendicular to the steering column 204. In the illustrated arrangement, an axis A' of the driving motor 250' extends over at least a portion of the frame assembly and extends rearward of the shock absorber 142 positioned on the same side of the vehicle 100. The motor body 254 of the driving motor 250' is positioned substantially behind one of the shock absorbers 142. Such positioning provides the driving motor 250' with enhanced protection from debris thrown up from the road surface.

In still other arrangement, driving motor 250" (also shown in phantom line) is positioned such that the drive shaft 256 is behind and substantially perpendicular to the steering column 204. As illustrated, an axis A" of the driving motor 250" extends over at least a portion of the frame assembly and extends forward of the shock absorber 142 on the same side of the vehicle body. The motor body 254 of the driving motor 250" preferably is positioned substantially in front of one of the shock absorbers 142. Such positioning provides additional separation between the driving motor 250" and the exhaust pipes 128, thereby reducing the likelihood that the driving motor 250" with be damaged by exhaust heat from the engine body 122. Such positioning also provides the driving motor 250" with protection from debris thrown up from the road surface.

Although the present invention has been described in terms of certain preferred embodiments, other embodiments apparent to those of ordinary skill in the art also are within the scope of this invention. Thus, various changes and modifications may be made without departing from the spirit and scope of the invention. For instance, various components may be repositioned as desired while maintaining the desired advantage or advantages of the present invention. Moreover, not all of the features, aspects and advantages are necessarily required to practice the present invention. Accordingly, the scope of the present invention is intended to be defined only by the claims that follow.

We claim:

1. An all terrain vehicle comprising:
   a frame assembly having a longitudinal portion and an upright portion;
   a pair of front wheels, each of the front wheels being connected to the frame assembly by a mechanical linkage capable of pivotal movement relative to the frame assembly;
   a steering shaft mounted to the frame assembly and operatively connected to the front wheels such that rotational movement of the steering shaft imparts a steering movement to the front wheels; and
   a power steering assembly having a longitudinal axis, the power steering assembly operatively connected to the steering shaft and configured to impart an auxiliary torque to the steering shaft;
   the longitudinal axis of the power steering assembly being oriented substantially perpendicular to the rotatable steering shaft and at least a portion of the power steering assembly being positioned directly above a longitudinal portion of the frame assembly with said longitudinal axis not extending in a fore-and-aft direction.

2. The vehicle of claim 1 further comprising a shock absorber positioned behind the power steering assembly.

3. The vehicle of claim 1 further comprising a shock absorber positioned forward of the power steering assembly.

4. The vehicle of claim 1 further comprising a radiator positioned forward of the power steering assembly and an engine positioned rearward of the power steering assembly.

5. The vehicle of claim 4 further comprising a cooling water supply hose hydraulically connecting the radiator and the engine, the cooling water supply hose extending between the radiator and the engine at a height vertically higher than the power steering assembly.

6. The vehicle of claim 5 further comprising a cooling fan positioned adjacent to the radiator.

7. The vehicle of claim 6, wherein the power steering assembly further comprises a power steering drive motor having a drive shaft with an axis oriented substantially parallel to the longitudinal axis of the power steering assembly and a first worm gear securely attached to the drive shaft of the power steering drive motor.

8. The vehicle of claim 7, wherein a second worm gear is attached to at least a portion of the steering shaft, such that the first worm gear engages the second worm gear.

9. The vehicle of claim 8, wherein the power steering assembly further comprises a potentiometer configured to detect the rotation angle and rotational speed of the steering shaft.

10. The vehicle of claim 1, wherein the power steering assembly comprises an electric motor.

11. The vehicle of claim 10, wherein the portion of the power steering assembly positioned directly above the longitudinal portion of the frame assembly comprises the electric motor.

12. An all terrain vehicle comprising:
a frame assembly having a longitudinal portion and an upright portion;
a plurality of wheels supporting the frame assembly, at least one of the wheels being steerable by a rotatable steering shaft; and
a power steering assembly having a longitudinal axis, the power steering assembly operatively connected to the steering shaft and configured to impart an auxiliary torque to the steering shaft;
the longitudinal axis of the power steering assembly being oriented substantially perpendicular to the rotatable steering shaft and at least a portion of the power steering assembly vertically overlapping a portion of the frame assembly and said longitudinal axis not extending in a fore-and-aft direction.

13. The vehicle of claim 12 further comprising a shock absorber operatively connected to at least one of the steerable wheels.

14. The vehicle of claim 13, wherein the shock absorber is positioned behind the power steering assembly.

15. The vehicle of claim 12 further comprising a radiator positioned forward of the power steering assembly and an engine positioned rearward of the power steering assembly.

16. The vehicle of claim 15 further comprising a cooling water supply hose hydraulically connecting the radiator and the engine, the cooling water supply hose extending above the power steering assembly.

17. The vehicle of claim 16 further comprising a cooling fan positioned adjacent to the radiator.

18. The vehicle of claim 12 further comprising a mechanical linkage capable of pivotal movement relative to the frame assembly and operatively connected to at least two of the wheels with at least a portion of the mechanical linkage extending under a portion of the power steering assembly.

19. The vehicle of claim 12, wherein the power steering assembly further comprises a power steering drive motor having a drive shaft oriented substantially parallel to the longitudinal axis of the power steering assembly and a first worm gear attached to the drive shaft of the power steering drive motor.

20. The vehicle of claim 19 further comprising a second worm gear that is attached to at least a portion of the steering shaft such tat the first worm gear engages the second worm gear.

21. The vehicle of claim 12, wherein the power steering assembly comprises an electric motor.

22. The vehicle of claim 21, wherein the portion of the power steering assembly that vertically overlaps the portion of the frame assembly comprises the electric motor.

23. An all terrain vehicle comprising a pair of front wheels, the pair of front wheels supporting a frame assembly, an engine being supported by the frame assembly, a steering column supported by the frame assembly, a set of handlebars connected to an upper portion of the steering column, a lower portion of the steering column operatively connected to the pair of front wheels, a power steering assembly disposed along a portion of the steering column, the power steering assembly operatively connected to the steering column, the power steering assembly comprising a motor having a longitudinal axis, the longitudinal axis of the motor extending in a generally lateral direction and at least a portion of the motor overlying a portion of the frame assembly.

24. The vehicle of claim 23, wherein one of the pair of front wheels is pivotally connected to the frame assembly by an arm and the arm is connected to the portion of the frame assembly that underlies the portion of the motor.

25. An all terrain vehicle comprising a frame assembly, an engine supported by the frame assembly, a seat and a fuel tank supported by the frame assembly, the engine being positioned generally below at least one of the seat and the fuel tank, a pair of steerable front wheels supporting a forward portion of the frame assembly, at least one tie rod being connected to at least one of the pair of front wheels, a steering shaft mounted to the frame assembly and extending downward in a region generally forward of the engine, the steering shaft supplying a torque that causes movement of the tie rod, a power steering assembly operatively connected to the steering shaft and being configured to impart an auxiliary torque to the steering shaft, and at least a portion of the power steering assembly extending over a longitudinally extending portion of the frame assembly and said portion of said power steering assembly not extending in a fore-and-aft direction.

26. The vehicle of claim 25, wherein the power steering assembly comprises an electric drive motor that provides the auxiliary torque.

27. The vehicle of claim 26, wherein the electric drive motor extends over the longitudinally extending portion of the frame assembly.

28. The vehicle of claim 26 further comprising handlebars that are attached to the steering column and positioned vertically above at least a portion of the engine.

29. The vehicle of claim 28, wherein the power steering assembly further comprises a potentiometer configured to detect the rotation angle and rotational speed of the steering shaft.

30. An all terrain vehicle comprising:
a frame assembly having a longitudinal portion and an upright portion;

a pair of front wheels, each of the front wheels being connected to the frame assembly by a mechanical linkage capable of pivotal movement relative to the frame assembly, a steering shaft mounted to the frame assembly and operatively connected to the front wheels such that rotational movement of the steering shaft imparts a steering movement to the front wheels; and a power steering assembly having a longitudinal axis, the power steering assembly operatively connected to the steering shaft and configured to impart an auxiliary torque to the steering shaft;

the longitudinal axis of the power steering assembly being oriented substantially perpendicular to the rotatable steering shaft and at least a portion of the power steering assembly being positioned directly above a longitudinal portion of the frame assembly;

a radiator positioned forward of the power steering assembly and an engine positioned rearward of the power steering assembly;

and a cooling water supply hose hydraulically connecting the radiator and the engine, the cooling water supply hose extending between the radiator and the engine at a height vertically higher than the power steering assembly.

31. The vehicle of claim 30 further comprising a cooling fan positioned adjacent to the radiator.

32. The vehicle of claim 31, wherein the power steering assembly further comprises a power steering drive motor having a drive shaft with an axis oriented substantially parallel to the longitudinal axis of the power steering assembly and a first worm gear securely attached to the drive shaft of the power steering drive motor.

33. The vehicle of claim 32, wherein a second worm gear is attached to at least a portion of the steering shaft, such that the first worm gear engages the second worm gear.

34. The vehicle of claim 33, wherein the power steering assembly further comprises a potentiometer configured to detect the rotation angle and rotational speed of the steering shaft.

35. The vehicle of claim 33, wherein the power steering assembly further comprises a potentiometer configured to detect the rotation angle and rotational speed of the steering shaft.

36. An all terrain vehicle comprising:
a frame assembly having a longitudinal portion and an upright portion;

a plurality of wheels supporting the frame assembly, at least one of the wheels being steerable by a rotatable steering shaft; and a power steering assembly having a longitudinal axis, the power steering assembly operatively connected to the steering shaft and configured to impart an auxiliary torque to the steering shaft;

the longitudinal axis of the power steering assembly being oriented substantially perpendicular to the rotatable steering shall and at least a portion of the power steering assembly vertically overlapping a portion of the frame assembly;

a radiator positioned forward of the power steering assembly and an engine positioned rearward of the power steering assembly; and a cooling water supply hose hydraulically connecting the radiator and the engine, the cooling water supply hose extending above the power steering assembly.

37. The vehicle of claim 36 further comprising a cooling fan positioned adjacent to the radiator.

38. An all terrain vehicle comprising:
a frame assembly having a longitudinal portion and an upright portion;

a plurality of wheels supporting the frame assembly, at least one of the wheels being steerable by a rotatable steering shaft; and a power steering assembly having a longitudinal axis, the power steering assembly operatively connected to the steering shaft and configured to impart an auxiliary torque to the steering shaft;

the longitudinal axis of the power steering assembly being oriented substantially perpendicular to the rotatable steering shaft and at least a portion of the power steering assembly vertically overlapping a portion of the frame assembly, the power steering assembly further comprising a power steering drive motor having a drive shaft oriented substantially parallel to the longitudinal axis of the power steering assembly and a first worm gear attached to the drive shaft of the power steering drive motor.

39. The vehicle of claim 38 further comprising a second worm gear that is attached to at least a portion of the steering shaft such that the first worm gear engages the second worm gear.

* * * * *

UNITED STATES PATENT AND TRADEMARK OFFICE
CERTIFICATE OF CORRECTION

PATENT NO. : 6,966,399 B2
APPLICATION NO. : 10/305818
DATED : November 22, 2005
INVENTOR(S) : Satoshi Tanigaki et al.

It is certified that error appears in the above-identified patent and that said Letters Patent is hereby corrected as shown below:

At column 3, line 40, delete "feature," and insert --features,--.

At column 3, line 43, delete "form" and insert --from--.

At column 10, line 9, delete "tat" and insert --that--.

At column 11, line 4, delete "assembly," and insert --assembly;--.

At column 12, line 10, delete "shall" and insert --shaft--.

Signed and Sealed this

Twenty-ninth Day of August, 2006

JON W. DUDAS
*Director of the United States Patent and Trademark Office*